(12) United States Patent
Foster et al.

(10) Patent No.: US 8,021,257 B2
(45) Date of Patent: Sep. 20, 2011

(54) HYDRAULIC CLUTCH CONTROL SYSTEM

(75) Inventors: Michael D. Foster, Carmel, IN (US); Jy-Jen F. Sah, West Bloomfield, MI (US); Peter E. Wu, Brighton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 364 days.

(21) Appl. No.: 12/333,591

(22) Filed: Dec. 12, 2008

(65) Prior Publication Data

US 2009/0253543 A1 Oct. 8, 2009

Related U.S. Application Data

(60) Provisional application No. 61/042,416, filed on Apr. 4, 2008.

(51) Int. Cl.
*F16H 3/72* (2006.01)
*F16H 31/00* (2006.01)
(52) U.S. Cl. ............................................. 475/5; 475/116
(58) Field of Classification Search ................... 475/116
See application file for complete search history.

(56) References Cited

U.S. PATENT DOCUMENTS 7,395,837 B2 7/2008 Foster et al.
2007/0072726 A1 * 3/2007 Dell'Eva et al. ............. 475/116

* cited by examiner

*Primary Examiner* — Edwin A Young
(74) *Attorney, Agent, or Firm* — Quinn Law Group, PLLC

(57) ABSTRACT

A transmission includes two blocking valves that control fluid pressure to a plurality of clutches. The blocking valves are characterized by a plurality of states that result in at least three transmission operating conditions. Each of the three operating conditions is characterized by fluid pressure being unavailable to at least one of the clutches.

15 Claims, 4 Drawing Sheets

FIG. 2

|        | C1 | C2 | C3 | C4 |
|--------|----|----|----|----|
| MODE 1 | X  |    | X  |    |
| G1     | X  |    | X  | X  |
| MODE 2 | X  | X  |    | X  |
| G2     | X  | X  |    | X  |
| MODE 3 |    | X  | X  | X  |
| G3     |    | X  | X  | X  |
| MODE 4 |    | X  |    |    |

FIG. 4

|               | N/C PCS5 | N/O PCS2 | N/C PCS4 | N/O PCS3 | X Blk | Y Blk |
|---------------|----------|----------|----------|----------|-------|-------|
| ALL AVAILABLE | C1       | C2       | C3       | C4       | 0     | 0     |
| M3/G3/M4      | ~~C1~~   | C2       | C3       | C4       | 1     | 0     |
| NEUTRAL       | ~~C1~~   | ~~C2~~   | C3       | C4       | 1     | 1     |
| M1/G1/M2      | C1       | ~~C2~~   | C3       | C4       | 0     | 1     |

| | N/C<br>PCS5 | N/O<br>PCS2 | N/C<br>PCS4 | N/O<br>PCS3 | X Blk | Y Blk |
|---|---|---|---|---|---|---|
| ALL AVAILABLE | C1 | C2 | C3 | C4 | 0 | 0 |
| M3/G3/M4 | | C2 | C3 | C4 | 1 | 0 |
| C4 NEUTRAL | | | | C4 | 1 | 1 |
| M1/G1/M2 | C1 | | | C4 | 0 | 1 |

FIG. 6

HYDRAULIC CLUTCH CONTROL SYSTEM

CROSS-REFERENCE TO RELATED APPLICATIONS

This application claims the benefit of U.S. Provisional Application 61/042,416, filed Apr. 4, 2008, and which is hereby incorporated by reference in its entirety.

TECHNICAL FIELD

This invention relates to hydraulic control systems for vehicular transmissions.

BACKGROUND OF THE INVENTION

In general, a motor vehicle transmission includes an input shaft and an output shaft. The input shaft is typically coupled to the vehicle engine through a fluid coupling such as a torque converter, and the output shaft is coupled to the vehicle drive wheels through a differential gear set. The transmission employs a number of gear elements and selectively engageable friction elements (referred to herein as clutches) that are controllable to vary the speed ratio between the transmission input and output shafts.

Transmissions are typically characterized by a plurality of fixed speed ratios. Each of the fixed speed ratios is achievable by engaging a particular combination of clutches. An electrically variable transmission includes at least one motor/generator, and is typically characterized by at least one electrically variable mode or range of operation in which the speed ratio between the input shaft and the output shaft is not fixed, but instead varies with the speed of the rotor of the motor/generator. An electrically variable transmission may be configured such that multiple electrically variable modes or ranges are achievable by engaging particular combinations of clutches. Other combinations of clutches in an electrically variable transmission may result in fixed speed ratio modes.

Shifting from a currently established fixed ratio or electrically variable mode to a new fixed ratio or electrically variable mode involves, in most cases, disengaging a clutch (off-going clutch) and engaging another clutch (on-coming clutch). Clutches may be engaged by the action of pressurized fluid against a piston in a clutch apply chamber. Accordingly, transmissions typically include a hydraulic circuit for supplying pressurized fluid to the apply chambers of the clutches.

SUMMARY OF THE INVENTION

A transmission includes an input member, an output member, and at least one motor/generator. First, second, third, and fourth clutches are engageable in response to fluid pressure in various combinations to provide at least one electrically variable mode of operation and at least one fixed ratio mode of operation. The transmission further includes a main passage, a first passage, a second passage, and a pump configured to supply fluid pressure to the main passage.

A first valve is configured to control fluid communication between the first clutch and the first passage. A second valve is configured to control fluid communication between the second clutch and the second passage. A third valve is configured to control fluid communication to the third clutch. A fourth valve is configured to control fluid communication between the fourth clutch and the main passage. A fifth valve is configured to control fluid communication between the main passage and the first passage. A sixth valve is configured to control fluid communication between the main passage and the second passage.

The transmission provided avoids undesired shift sequencing and clutch combinations. In an exemplary embodiment, the default settings of the valves is such that the clutches are engaged in a combination that provides a pre-established transmission mode. Accordingly, in the event of a loss of power to the transmission controller, the transmission will enter the pre-established transmission mode.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 2 is a truth table depicting a shift logic for the transmission of FIG. 1;

FIG. 4 is a truth table depicting the availability of the clutches of FIG. 1 during various states of the blocking valves of the hydraulic clutch actuation control system of FIG. 3;

FIG. 6 is a truth table depicting the availability of the clutches of FIG. 1 during various states of the blocking valves of the hydraulic clutch actuation control system of FIG. 5.

DESCRIPTION OF THE PREFERRED EMBODIMENTS

Figure 1:
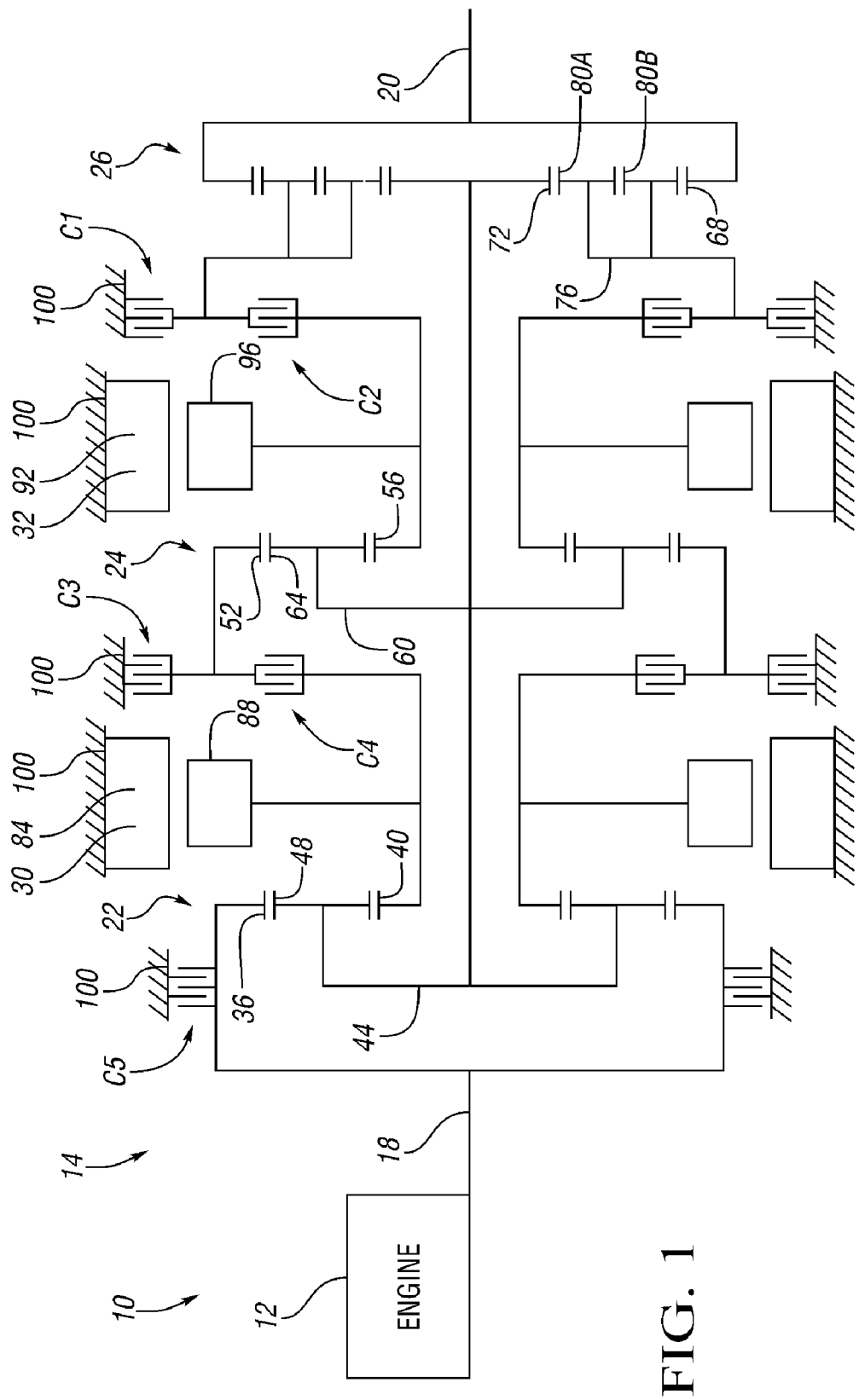
FIG. 1 is a schematic depiction of a powertrain including an electrically variable transmission with a plurality of clutches.

Referring to the drawings wherein like characters represent the same or corresponding parts throughout the several views, there is seen in FIG. 1 a powertrain 10 having an engine 12 and an electrically variable hybrid transmission 14. The engine 12 in one embodiment is a reciprocating, internal combustion engine, and may, for example, be spark ignition or compression ignition. The electrically variable hybrid transmission 14 includes an input shaft 18, an output shaft 20, three planetary gearsets 22, 24, and 26, five torque transmitting mechanisms C1, C2, C3, C4, and C5 (also referred to herein as "clutches"), and two electrical power units or motor/generators 30, 32.

Planetary gearset 22 includes a ring gear member 36, a sun gear member 40, and a planet carrier 44 that rotatably supports a plurality of planet gear members 48. Each of the planet gear members 48 meshingly engages the sun gear member 40 and the ring gear member 36. Planetary gearset 24 includes a ring gear member 52, a sun gear member 56, and a planet carrier 60 that rotatably supports a plurality of planet gear members 64. Each of the planet gear members 64 meshingly engages the sun gear member 56 and the ring gear member 52. Planetary gearset 26 includes a ring gear member 68, a sun gear member 72, and a planet carrier 76 that rotatably supports a plurality of planet gear members 80A, 80B. Each of the planet gear members 80A meshingly engages the sun gear member 72 and a respective one of the planet gear members 80B. Each of the planet gear members 80B meshingly engages the ring gear member 68 and a respective one of the planet gear members 80A.

Motor/generator 30 includes a stator 84 and a rotor 88. Motor/generator 32 includes a stator 92 and a rotor 96. Ring gear member 36 is operatively connected to the input shaft 18 for unitary rotation therewith. Sun gear member 40 is operatively connected to rotor 88 for unitary rotation therewith. Planet carrier 44, planet carrier 60, and sun gear member 72 are operatively interconnected for unitary rotation. Sun gear member 56 is operatively connected to rotor 96 for unitary rotation therewith. The output shaft 20 is operatively connected to ring gear member 68 for unitary rotation therewith.

Clutch C1 is selectively engageable to operatively connect planet carrier 76 to a stationary member such as transmission housing 100. Clutch C2 is selectively engageable to operatively connect planet carrier 76 to rotor 96 and sun gear member 56 for unitary rotation. Clutch C3 is selectively engageable to operatively connect ring gear member 52 to the housing 100. Clutch C4 is selectively engageable to operatively connect ring gear member 52 to sun gear member 40 and rotor 88 for unitary rotation.

Motor/generators 30, 32 are in electrical communication with an energy storage device (not shown) such as a battery or an ultracapacitor, and are controlled by a control unit (not shown).

Referring to FIGS. 1 and 2, the planetary gear arrangement, as shown in FIG. 1, provides four electrically variable modes of operation and three fixed ratio mode of operation. In the four electrically variable modes, the speed ratio between the input shaft 18 and the output shaft 20 is variable and depends on the speed of the rotor 88, 96 of one or both of the motor/generators 30, 32. In the fixed ratio modes, the speed ratio between the input shaft 18 and the output shaft 20 is fixed. In the first electrically variable mode, i.e., Mode 1, clutches C1 and C3 are engaged, and clutches C2 and C4 are disengaged. In the first fixed ratio mode, i.e., G1, clutches C1, C3, and C4 are engaged, and clutch C2 is disengaged. In the second electrically variable mode, i.e., Mode 2, clutches C1 and C4 are engaged, and clutches C2 and C3 are disengaged. In the second fixed ratio mode, i.e., G2, clutches C1, C2, and C4 are engaged, and clutch C3 is disengaged. In the third electrically variable mode, i.e., Mode 3, clutches C2 and C4 are engaged, and clutches C1 and C3 are disengaged. In the third fixed ratio mode, i.e., G3, clutches C2, C3, and C4 are engaged and clutch C1 is disengaged. In the fourth electrically variable mode, i.e., Mode 4, clutches C2 and C3 are engaged, and clutches C1 and C4 are disengaged.

Figure 3:
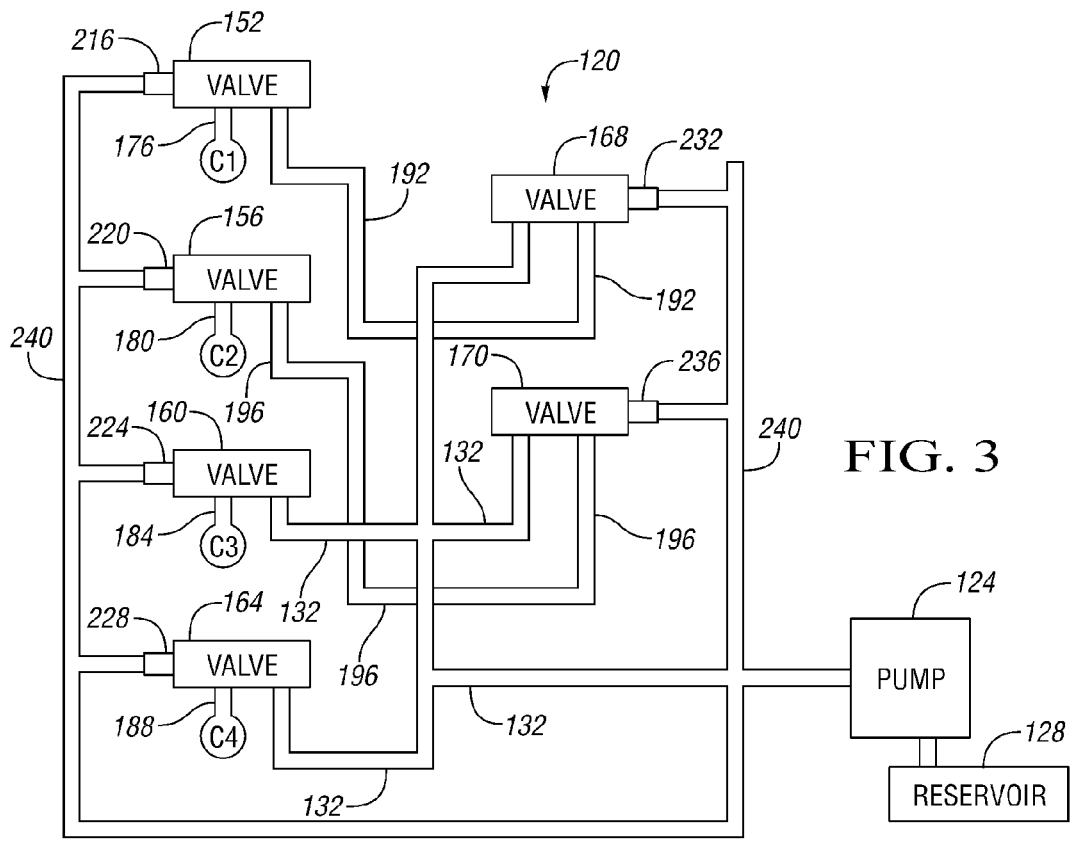
FIG. 3 is a schematic depiction of a hydraulic clutch actuation control system for the transmission of FIG. 1.

Referring to FIG. 3, a hydraulic clutch actuation control system 120 is schematically depicted. The system 120 includes at least one hydraulic pump 124, such as a fixed displacement pump, that draws fluid from a reservoir 128 for delivery to a main passage 132. In an exemplary embodiment, an engine-driven pump and an electrically driven pump may be used to deliver fluid from the reservoir 128 to the main passage 132; a check valve (not shown) would selectively distribute pressurized fluid to the main passage 132 depending upon which of the pumps is operating. A pressure relief valve (not shown) may be provided in fluid communication with the outlet of the hydraulic pump 124 to guard against over pressurization of the main passage 132.

The system 120 also includes four trim valves 152, 156, 160, 164 and two shift valves, or blocking valves 168, 170. Each of clutches C1, C2, C3, C4 is operatively connected to a respective one of the trim valves 152, 156, 160, 164, which controls the application and release of the clutch. That is, each of clutches C1, C2, C3, C4 is applied by the application of hydraulic pressure, as understood by those skilled in the art. Pressurized fluid from the pump 124 is supplied to valves 160, 164, 168, 170 via main passage 132.

Passage 176 provides fluid communication between valve 152 and clutch C1. Passage 180 provides fluid communication between valve 156 and clutch C2. Passage 184 provides fluid communication between valve 160 and clutch C3. Passage 188 provides fluid communication between valve 164 and clutch C4.

Main passage 132 provides fluid communication between the pump 124 and valves 160, 164, 168, 170. Accordingly, main passage 132 supplies high pressure fluid from pump 124 to each of valves 160, 164, 168, 170. Passage 192 provides fluid communication between valve 168 and valve 152. Passage 196 provides fluid communication between valve 170 and valve 156.

Each valve 152, 156, 160, 164, 168, 170 includes a respective valve member (not shown) that is selectively movable to control which of the various passages connected to each valve are in fluid communication with one another, as understood by those skilled in the art. The valve member of valve 168 is selectively movable between first and second positions. A spring (not shown) biases the valve member of valve 168 in the first position. In the first position, the valve member of valve 168 permits fluid communication between passage 192 and main passage 132. In its second position, the valve member of valve 168 prevents fluid communication between passage 192 and main passage 132. When the valve member of valve 168 is in its second position, the valve 168 provides fluid communication between passage 192 and a backfill passage (not shown), and therefore there is insufficient pressure available in passage 192 to apply clutch C1.

The valve member of valve 170 is selectively movable between first and second positions. A spring (not shown) biases the valve member of valve 170 in the first position. In the first position, the valve member of valve 170 permits fluid communication between passage 196 and main passage 132. In its second position, the valve member of valve 170 prevents fluid communication between passage 196 and main passage 132. When the valve member of valve 170 is in its second position, the valve 170 provides fluid communication between passage 196 and the backfill passage (not shown), and therefore there is insufficient pressure available in passage 196 to apply clutch C2.

The valve member of valve 152 is selectively movable within the body of valve 152 between a first position in which the valve member obstructs fluid communication between passage 176 and passage 192, and a second position in which the valve member permits fluid communication between passage 176 and passage 192. A spring biases the valve member of valve 152 in its first position. The valve member of valve 156 is selectively movable within the body of valve 156 between a first position in which the valve member obstructs fluid communication between passage 180 and passage 196, and a second position in which the valve member permits fluid communication between passage 180 and passage 196. A spring biases the valve member of valve 156 in its first position. The valve member of valve 160 is selectively movable within the body of valve 160 between a first position in which the valve member obstructs fluid communication between passage 184 and main passage 132, and a second position in which the valve member permits fluid communication between passage 184 and main passage 132. A spring biases the valve member of valve 160 in its first position. The valve member of valve 164 is selectively movable within the body of valve 164 between a first position in which the valve member obstructs fluid communication between passage 188 and main passage 132, and a second position in which the valve member permits fluid communication between passage 188 and main passage 132. A spring biases the valve member of valve 164 in its first position.

In their respective first positions, each of the valve members of valves 152, 156, 160, 164 provide fluid communication between a respective one of passages 176, 180, 184, 188 and the backfill (exhaust) passage (not shown). In an exemplary embodiment, valves 152, 156, 160, 164, 168, 170 are slide valves; other valve types may be employed within the scope of the claimed invention.

Valves 152, 156, 160, 164, 168, 170 are hydraulically actuated; that is, the valve members of valves 152, 156, 160, 164, 168, 170 are movable from their respective first positions to their respective second positions in response to fluid pressure from pump 124 acting sufficiently thereon. The system 120 also includes six solenoid valves 216, 220, 224, 228, 232 and 236 in fluid communication with the pump 124 via passages 240. Each of the solenoid valves 216, 220, 224, 228, 232 and 236, when open (or high), permits fluid pressure to act on a respective one of the valve members to move the respective member to its second position. Each of the solenoid valves 216, 220, 224, 228, 232 and 236, when closed (or low) does not permit sufficient pressure to act against a respective one of the valve members to overcome the spring bias and the respective valve member remains in its first position.

More specifically, solenoid valve 216 controls fluid communication to the member of valve 152 that overcomes the spring bias to move the member from its first position to its second position. When the solenoid valve 216 is open, the member of valve 152 is in the second position and valve 152 permits fluid communication between clutch C1 and passage 192 via passage 176. When the solenoid valve 216 is closed, the member of valve 152 is in the first position and valve 152 prevents fluid communication between the clutch C1 and passage 192. Thus, when the solenoid valve 216 is closed, there is insufficient pressure in passage 176 to apply clutch C1.

Solenoid valve 220 controls fluid communication to the member of valve 156 that overcomes the spring bias to move the member from its first position to its second position. When the solenoid valve 220 is open, the member of valve 156 is in the second position and valve 156 permits fluid communication between clutch C2 and passage 196 via passage 180. When the solenoid valve 220 is closed, the member of valve 156 is in the first position and valve 156 prevents fluid communication between the clutch C2 and passage 196. Thus, when the solenoid valve 220 is closed, there is insufficient pressure in passage 180 to apply clutch C2.

Solenoid valve 224 controls fluid communication to the member of valve 160 that overcomes the spring bias to move the member from its first position to its second position. When the solenoid valve 224 is open, the member of valve 160 is in the second position and valve 160 permits fluid communication between clutch C3 and passage 132 via passage 184. When the solenoid valve 224 is closed, the member of valve 160 is in the first position and valve 160 prevents fluid communication between the clutch C3 and passage 132. Thus, when the solenoid valve 224 is closed, there is insufficient pressure in passage 184 to apply clutch C3.

Solenoid valve 228 controls fluid communication to the member of valve 164 that overcomes the spring bias to move the member from its first position to its second position. When the solenoid valve 228 is open, the member of valve 164 is in the second position and valve 164 permits fluid communication between clutch C4 and passage 132 via passage 188. When the solenoid valve 228 is closed, the member of valve 164 is in the first position and valve 164 prevents fluid communication between the clutch C4 and passage 132. Thus, when the solenoid valve 228 is closed, there is insufficient pressure in passage 188 to apply clutch C4.

Solenoid valve 232 controls fluid communication to the member of valve 168 that overcomes the spring bias to move the member from its first position to its second position. When the solenoid valve 232 is closed, the member of valve 168 is in the first position and valve 168 permits fluid communication between the main passage 132 and passage 192. When the solenoid valve 232 is open, the member of valve 168 is in the second position and valve 168 prevents fluid communication between the main passage 132 and passage 192. Solenoid valve 236 controls fluid communication to the member of valve 170 that overcomes the spring bias to move the member from its first position to its second position. When the solenoid valve 236 is closed, the member of valve 170 is in the first position and valve 170 permits fluid communication between the main passage 132 and passage 196. When the solenoid valve 236 is open, the member of valve 170 is in the second position and valve 170 prevents fluid communication between the main passage 132 and passage 196.

Solenoid valves 232, 236 are on/off type solenoid valves, and solenoid valves 216, 220, 224, 228 are variable pressure (proportional control) type solenoid valves. Solenoid valves 216, 224, 232, and 236 are normally low or normally closed type solenoid valves, and solenoid valves 220, 228 are normally high or normally open type solenoid valves. A normally open (or normally high) solenoid valve will distribute pressurized fluid or an output pressure when not energized (in the absence of an electrical signal to the solenoid). A normally low (or normally closed) solenoid valve does not supply pressure when not energized. As used herein, the default state of a valve 152, 156, 160, 164, 168, 170 corresponds to the position of the valve member when the corresponding solenoid valve 216, 220, 224, 228, 232, 236 is not energized.

Clutch C1 is engageable only if sufficient fluid pressure is present in passage 192. Clutch C2 is engageable only if sufficient fluid pressure is present in passage 196. Sufficient fluid pressure is obtained in a passage 192, 196 by providing fluid communication between the passage 192, 196 and the main passage 132. The presence of sufficient fluid pressure in passages 192, 196 is dependent upon the status of the blocking valves 168, 170. Thus, the availability of the electrically variable modes and the fixed ratio modes is dependent upon the status of the blocking valves 168, 170. Clutch C3 is engageable independent of the status of blocking valves 168, 170, because valve 160 is in direct fluid communication with main passage 132 and can provide fluid communication between main passage 132 and the clutch C3 via passage 184. Clutch C4 is engageable independent of the status of blocking valves 168, 170, because valve 164 is in direct fluid communication with main passage 132 and can provide fluid communication between main passage 132 and the clutch C4 via passage 188.

Referring to FIGS. 3 and 4, there are four possible operating configurations of blocking valves 168 and 170, which are determined by the activation status of the solenoid valves 232, 236. The four possible operating configurations of blocking valves 168, 170 result in four transmission operating conditions, each having a different availability of clutches C1-C4. In FIG. 4, the status of solenoid valve 232 is depicted in the column labeled "X Blk" and the status of solenoid valve 236 is depicted in the column labeled "Y Blk." The numeral "1" indicates that the solenoid valve is activated or energized, and the number "0" indicates that the solenoid valve is deactivated, or not energized. In a first operating configuration, as depicted in the first row of the table of FIG. 4, neither of the solenoid valves 232, 236 is energized and therefore both of the valve members of valves 168, 170 are in their respective first positions. Accordingly, in the first configuration, all clutches C1, C2, C3, C4 are available for engagement.

In a second operating configuration, as depicted in the second row of the table of FIG. 4, solenoid valve 232 is energized and solenoid valve 236 is not energized, and therefore clutch C1 is not engageable, and clutches C2-C4 are engageable. Accordingly, only Mode 3, G3, and Mode 4 are possible in the second operating configuration.

In a third operating configuration, as depicted in the third row of the table of FIG. 4, both solenoid valves 232, 236 are energized, and therefore clutch C1 and C2 are not engageable. In the third operating configuration, the transmission is in a "neutral" mode.

In a fourth operating configuration, as depicted in the fourth row of the table of FIG. 4, solenoid valve 232 is not energized, and therefore clutch C1 is engageable. Solenoid valve 236 is energized, and therefore clutch C2 is not engageable. Accordingly, only Mode 1, G1, and Mode 2 are possible in the fourth operating configuration The four available logic combinations of the two blocking valves provide four operating zones. Low ranges only, high ranges only, all ranges, and neutral only. In the event of power loss to the transmission controller, two normally high solenoids 220, 228 are used to actuate two clutch control valves 156, 164 to provide the correct combination of clutches to provide EVT MODE 3 operation. During power-off conditions, the blocking valves 168, 170 are mechanized not to block the MODE 3 clutches C2, C4. In the neutral zone, the combination of "blocked" clutches C1, C2 does not allow clutch combinations which are capable of transmitting transmission torque to the drive wheels, therefore always allowing neutral, even in the event of a clutch control valve in an unintended position.

The concurrent application of clutches C1, C2, and C3 may cause the transmission 14 to lock up, and therefore it is desirable to avoid the condition in which all of clutches C1, C2, and C3 are applied. By operating the transmission 14 only in the second, third, and fourth operating configurations shown in FIG. 4, the system 120 provides acceptable operating modes which prevent, or "lock-out" the undesired shift sequencing and clutch combinations. If G2 is desired, then the first operating configuration will be used; in an exemplary embodiment, pressure switches will be monitored to determine whether clutches C1, C2, and C3 are applied, and, if so, revert to one of the second, third, or fourth operating configurations.

Figure 5:
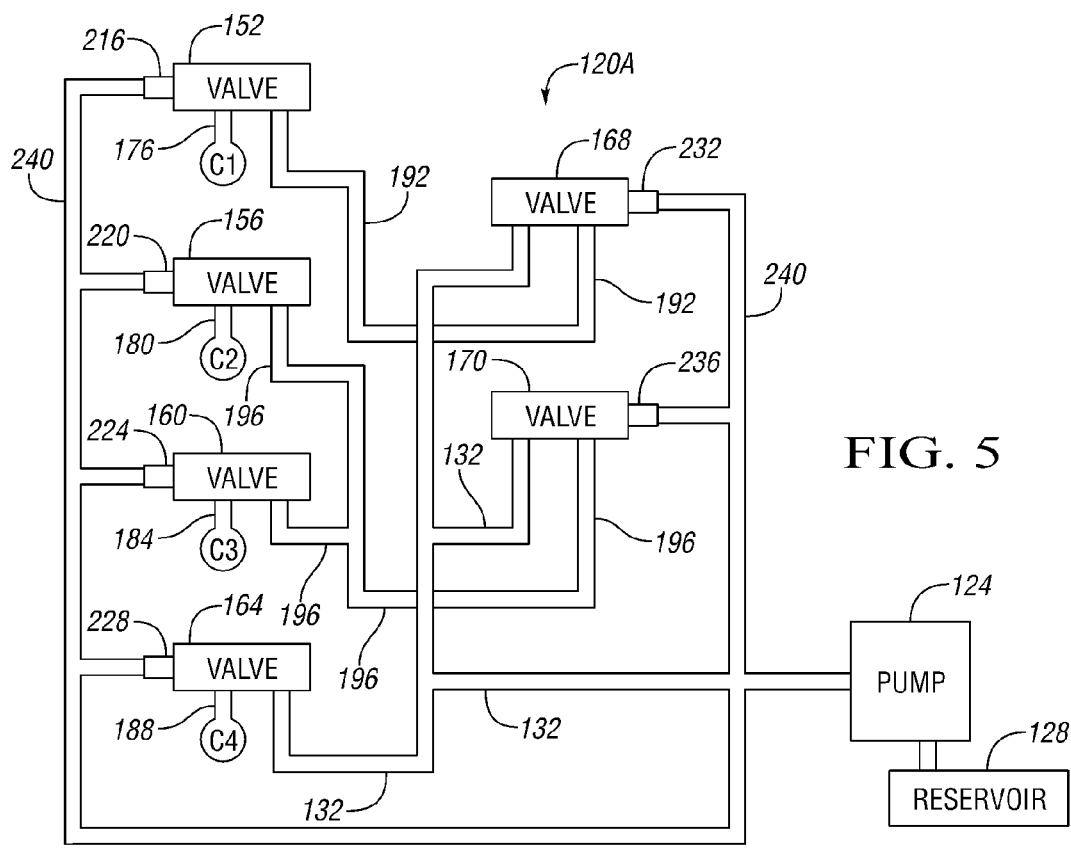
FIG. 5 is a schematic depiction of another hydraulic clutch actuation control system for the transmission of FIG. 1.

Referring to FIG. 5, an alternative embodiment of the system 120A is schematically depicted. System 120A is substantially identical to the system shown at 120 in FIG. 3, except that valve 160 controls fluid communication between clutch C3 and passage 196. Thus, in system 120A, the application of clutch C3 is dependent upon the status of valve 170. FIG. 6, which is characterized by the same format and notation as FIG. 4, depicts the four operating configurations of the valves 168, 170 in system 120A and the resulting available modes of transmission operation. It should be noted that, in system 120A, when solenoid valve 236 is energized, both clutch C2 and C3 are unavailable.

While the best modes for carrying out the invention have been described in detail, those familiar with the art to which this invention relates will recognize various alternative designs and embodiments for practicing the invention within the scope of the appended claims.

The invention claimed is:

1. A transmission comprising:
an input member; an output member; at least one motor/generator;
first, second, third, and fourth clutches being engageable in response to fluid pressure, said clutches being engageable in various combinations to provide at least one electrically variable mode of operation in which the speed ratio between the input member and the output member is dependent upon the speed of said at least one motor/generator and at least one fixed ratio mode of operation in which the speed ratio between the input member and the output member is fixed;
a main passage, a first passage, and a second passage;
a pump configured to supply fluid pressure to the main passage;
a first valve configured to control fluid communication between the first clutch and the first passage;
a second valve configured to control fluid communication between the second clutch and the second passage;
a third valve configured to control fluid communication to the third clutch;
a fourth valve configured to control fluid communication between the fourth clutch and the main passage;
a fifth valve configured to control fluid communication between the main passage and the first passage; and
a sixth valve configured to control fluid communication between the main passage and the second passage.

2. The transmission of claim 1, wherein the third valve is configured to control fluid communication between the third clutch and the main passage.

3. The transmission of claim 2, wherein said at least one electrically variable mode includes four electrically variable modes and said at least one fixed ratio mode includes three fixed ratio modes.

4. The transmission of claim 3, wherein the first, second, third, fourth, fifth, and sixth valves are characterized by respective default states; and wherein the transmission is in one of the electrically variable modes when the first, second, third, fourth, fifth, and sixth valves are in their respective default states.

5. The transmission of claim 2, wherein said at least one motor/generator includes a first motor/generator having a first rotor, and a second motor/generator having a second rotor;
wherein the transmission further comprises first, second, and third planetary gearsets having respective first, second, and third members;
a stationary member;
the first member of the first gearset being operatively connected to the input member for rotation therewith;
the second member of the first gearset, the first member of the second gearset, and the first member of the third gearset being operatively connected to each other for rotation therewith;
the third member of the first gearset being operatively connected to the first rotor for rotation therewith;
the second member of the second gearset being operatively connected to the second rotor for rotation therewith; and
the second member of the third gearset being operatively connected to the output member for rotation therewith;
wherein the first clutch is configured to selectively couple the third member of the third gearset to the stationary member;
wherein the second clutch is configured to selectively couple the third member of the third gearset to the second rotor and the second member of the second gearset for rotation therewith;
wherein the third clutch is configured to selectively couple the third member of the second gearset to the stationary member; and wherein the fourth clutch is configured to selectively couple the third member of the second gearset to the first rotor and the third member of the first gearset for rotation therewith.

6. The transmission of claim 1, wherein the third valve is configured to control fluid communication between the third clutch and the second passage.

7. The transmission of claim 6, wherein said at least one electrically variable mode includes four electrically variable modes and said at least one fixed ratio mode includes three fixed ratio modes.

8. The transmission of claim 7, wherein the first, second, third, fourth, fifth, and sixth valves are characterized by respective default states; and wherein the transmission is in one of the electrically variable modes when the first, second, third, fourth, fifth, and sixth valves are in their respective default states.

9. The transmission of claim 6, wherein said at least one motor/generator includes a first motor/generator having a first rotor, and a second motor/generator having a second rotor;
wherein the transmission further comprises first, second, and third planetary gearsets having respective first, second, and third members;
a stationary member;
the first member of the first gearset being operatively connected to the input member for rotation therewith;
the second member of the first gearset, the first member of the second gearset, and the first member of the third gearset being operatively connected to each other for rotation therewith;
the third member of the first gearset being operatively connected to the first rotor for rotation therewith;
the second member of the second gearset being operatively connected to the second rotor for rotation therewith; and
the second member of the third gearset being operatively connected to the output member for rotation therewith;
wherein the first clutch is configured to selectively couple the third member of the third gearset to the stationary member;
wherein the second clutch is configured to selectively couple the third member of the third gearset to the second rotor and the second member of the second gearset for rotation therewith;
wherein the third clutch is configured to selectively couple the third member of the second gearset to the stationary member; and
wherein the fourth clutch is configured to selectively couple the third member of the second gearset to the first rotor and the third member of the first gearset for rotation therewith.

10. A transmission comprising:
an input member; an output member; at least one motor/generator;
first, second, third, and fourth clutches being engageable in various combinations to provide at least one electrically variable mode of operation in which the speed ratio between the input member and the output member is dependent upon the speed of said at least one motor/generator and at least one fixed ratio mode of operation in which the speed ratio between the input member and the output member is fixed;
a main passage, a first passage, and a second passage;
first, second, third, fourth, fifth, and sixth solenoid valves;
a pump configured to supply fluid pressure to the main passage and to the first, second, third, fourth, fifth, and sixth solenoid valves;
a first valve configured to provide fluid communication between the first passage and the first clutch when the first solenoid valve is open, and to prevent fluid communication between the first passage and the first clutch when the first solenoid valve is closed;
a second valve configured to provide fluid communication between the second passage and the second clutch when the second solenoid valve is open, and to prevent fluid communication between the second passage and the second clutch when the second solenoid valve is closed;
a third valve configured to provide fluid communication between the main passage and the third clutch when the third solenoid valve is open, and to prevent fluid communication between the main passage and the third clutch when the third solenoid valve is closed;
a fourth valve configured to provide fluid communication between the main passage and the fourth clutch when the fourth solenoid valve is open, and to prevent fluid communication between the main passage and the fourth clutch when the fourth solenoid valve is closed;
a fifth valve configured to provide fluid communication between the main passage and the first passage when the fifth solenoid valve is closed, and to prevent fluid communication between the main passage and the first passage when the fifth solenoid valve is open; and
a sixth valve configured to provide fluid communication between the main passage and the second passage when the sixth solenoid valve is closed, and to prevent fluid communication between the main passage and the second passage when the sixth solenoid valve is open.

11. The transmission of claim 10, wherein the first, third, fifth, and sixth solenoid valves are closed when unenergized; and
wherein the second and fourth solenoid valves are open when unenergized.

12. The transmission of claim 11, wherein said at least one motor/generator includes a first motor/generator having a first rotor, and a second motor/generator having a second rotor;
wherein the transmission further comprises first, second, and third planetary gearsets having respective first, second, and third members;
a stationary member;
the first member of the first gearset being operatively connected to the input member for rotation therewith;
the second member of the first gearset, the first member of the second gearset, and the first member of the third gearset being operatively connected to each other for rotation therewith;
the third member of the first gearset being operatively connected to the first rotor for rotation therewith;
the second member of the second gearset being operatively connected to the second rotor for rotation therewith; and
the second member of the third gearset being operatively connected to the output member for rotation therewith;
wherein the first clutch is configured to selectively couple the third member of the third gearset to the stationary member;
wherein the second clutch is configured to selectively couple the third member of the third gearset to the second rotor and the second member of the second gearset for rotation therewith;
wherein the third clutch is configured to selectively couple the third member of the second gearset to the stationary member; and wherein the fourth clutch is configured to selectively couple the third member of the second gearset to the first rotor and the third member of the first gearset for rotation therewith.

13. A transmission comprising:
an input member; an output member; at least one motor/generator;
first, second, third, and fourth clutches being engageable in various combinations to provide at least one electrically variable mode of operation in which the speed ratio between the input member and the output member is dependent upon the speed of said at least one motor/generator and at least one fixed ratio mode of operation in which the speed ratio between the input member and the output member is fixed;
a main passage, a first passage, and a second passage;
first, second, third, fourth, fifth, and sixth solenoid valves;
a pump configured to supply fluid pressure to the main passage and to the first, second, third, fourth, fifth, and sixth solenoid valves;
a first valve configured to provide fluid communication between the first passage and the first clutch when the first solenoid valve is open, and to prevent fluid communication between the first passage and the first clutch when the first solenoid valve is closed;
a second valve configured to provide fluid communication between the second passage and the second clutch when the second solenoid valve is open, and to prevent fluid communication between the second passage and the second clutch when the second solenoid valve is closed;
a third valve configured to provide fluid communication between the second passage and the third clutch when the third solenoid valve is open, and to prevent fluid communication between the second passage and the third clutch when the third solenoid valve is closed;
a fourth valve configured to provide fluid communication between the main passage and the fourth clutch when the fourth solenoid valve is open, and to prevent fluid communication between the main passage and the fourth clutch when the fourth solenoid valve is closed;
a fifth valve configured to provide fluid communication between the main passage and the first passage when the fifth solenoid valve is closed, and to prevent fluid communication between the main passage and the first passage when the fifth solenoid valve is open; and
a sixth valve configured to provide fluid communication between the main passage and the second passage when the sixth solenoid valve is closed, and to prevent fluid communication between the main passage and the second passage when the sixth solenoid valve is open.

14. The transmission of claim 13, wherein the first, third, fifth, and sixth solenoid valves are closed when unenergized; and
wherein the second and fourth solenoid valves are open when unenergized.

15. The transmission of claim 14, wherein said at least one motor/generator includes a first motor/generator having a first rotor, and a second motor/generator having a second rotor;
wherein the transmission further comprises first, second, and third planetary gearsets having respective first, second, and third members;
a stationary member;
the first member of the first gearset being operatively connected to the input member for rotation therewith;
the second member of the first gearset, the first member of the second gearset, and the first member of the third gearset being operatively connected to each other for rotation therewith;
the third member of the first gearset being operatively connected to the first rotor for rotation therewith;
the second member of the second gearset being operatively connected to the second rotor for rotation therewith; and
the second member of the third gearset being operatively connected to the output member for rotation therewith;
wherein the first clutch is configured to selectively couple the third member of the third gearset to the stationary member;
wherein the second clutch is configured to selectively couple the third member of the third gearset to the second rotor and the second member of the second gearset for rotation therewith;
wherein the third clutch is configured to selectively couple the third member of the second gearset to the stationary member; and
wherein the fourth clutch is configured to selectively couple the third member of the second gearset to the first rotor and the third member of the first gearset for rotation therewith.

* * * * *